(12) United States Patent
Solakian

(10) Patent No.: US 8,495,952 B2
(45) Date of Patent: Jul. 30, 2013

(54) SKEWERED FOOD REMOVAL DEVICE

(76) Inventor: John S. Solakian, Weston, MA (US)

( * ) Notice: Subject to any disclaimer, the term of this patent is extended or adjusted under 35 U.S.C. 154(b) by 541 days.

(21) Appl. No.: 12/460,154

(22) Filed: Jul. 15, 2009

(65) Prior Publication Data

US 2011/0011279 A1 Jan. 20, 2011

(51) Int. Cl.
*A47J 37/04* (2006.01)
(52) U.S. Cl.
USPC .......................................... 99/419; 99/421 A
(58) Field of Classification Search
USPC ..................... 99/422, 419, 446, 421 A, 421 R, 99/421 H, 441
See application file for complete search history.

(56) References Cited

U.S. PATENT DOCUMENTS

| | | | |
|---|---|---|---|
| 5,177,941 A * | 1/1993 | Tharp et al. | 56/1 |
| 6,260,896 B1 * | 7/2001 | Dozier | 294/9 |
| 6,286,418 B1 * | 9/2001 | Berke et al. | 99/421 A |
| 6,706,301 B2 * | 3/2004 | Vaughan | 426/466 |
| 2006/0059882 A1 * | 3/2006 | Schneider | 56/400.12 |
| 2006/0191145 A1 * | 8/2006 | Mithal et al. | 30/322 |
| 2008/0264655 A1 * | 10/2008 | Knowlden | 172/378 |

* cited by examiner

*Primary Examiner* — Henry Yuen
*Assistant Examiner* — Phuong Nguyen

(57) ABSTRACT

A food removal device for removing food from a skewer, which device includes a body portion with a slot therein for fitting over a skewer so that the food or portion thereof may be removed from the skewer. The body portion of the device is connected to a handle via an arm at an angle with the body portion so as to facilitate the removal of the food from the skewer.

1 Claim, 2 Drawing Sheets

SKEWERED FOOD REMOVAL DEVICE

BACKGROUND OF THE INVENTION

(1) Field of Invention

This invention relates to skewers used for cooking food such as on a barbeque and more particularly to a food removal device which is adapted to easily remove such food from the skewers.

(2) Description

Skewers, such as those used for barbeques, selectively receive food to be placed upon a grill or over a fire to be cooked or warmed. Some skewers possess a handle which permits a user or server to take the cooked or warmed food from the grill or fire without burning or injuring hands or fingers. Prior art skewers, however, suffer from drawbacks. These skewers do not typically allow cooked food to be easily or readily removed from the skewer after the skewer has been taken from the grill or fire. The result is that the user or server must "scrape" or otherwise forcibly attempt to remove the food from the skewer. Such forcible removal is undesirable since there is a considerable risk of causing burns or injury to the user, server or the skewer. Forcible removal may also cause the food to "travel" across the table causing soilage, spillage and embarrassment. The food might land on the floor or some other area that may contaminate and ruin the food. The result also may be excessive handling and manipulating of the food which also may contaminate and prevent consumption of the food. This mishandling of the skewer could also result in injury and burned fingers, hands or arms when attempting to remove the hot food from the skewer.

One possible solution for the above is set forth in U.S. Pat. No. 6,286,418, Issued Sep. 11, 2001 ("Berke, et al"). However, such solution of the Berke, et al patent requires special skewers with a built-in food removal slide which fits to the specific shape of the skewer. If one wishes to cook food which requires several skewers, then he or she must have a sufficient number of the Berke, et al skewers to cook such food.

BRIEF SUMMARY OF THE INVENTION

It is an objective of the present invention to provide a food removal device for use in conjunction with a skewer which overcomes the previously delineated drawbacks of prior skewer food removal devices.

According to a one aspect of the present invention, a device which allows food to be easily removed from a skewer is disclosed. The device comprises a removing member which fits over a skewer behind the food to be removed, together with a handle and an arm which is connected between the removing member and the handle such that a gentle push with the handle allows the food to be easily removed from the skewer.

According to another aspect of the present invention, the removing member is designed to be placed over a skewer so that the removing member is in substantially maximum contact with the last piece of food to be removed, such removing member being capable of being placed at any location on the skewer so that all or only a portion of the food is removed from the skewer. The removing member comprises a body portion having a slot designed to be placed over the food holding shaft or shafts of the skewer.

According to a further aspect of the present invention, the slot of the removing member is designed to adapt to different sizes of the skewer shafts.

These and other objects, aspects, and advantages of the present invention will become apparent upon reading the following detailed description in combination with the accompanying drawings.

In employing the teachings of the present invention, a plurality of alternate constructions can be adopted to achieve the desired results and capabilities. In this disclosure, only several embodiments are disclosed. However, these embodiments are intended as examples and should not be considered as limiting the scope of the invention.

DETAILED DESCRIPTION OF THE INVENTION

Figure 1:
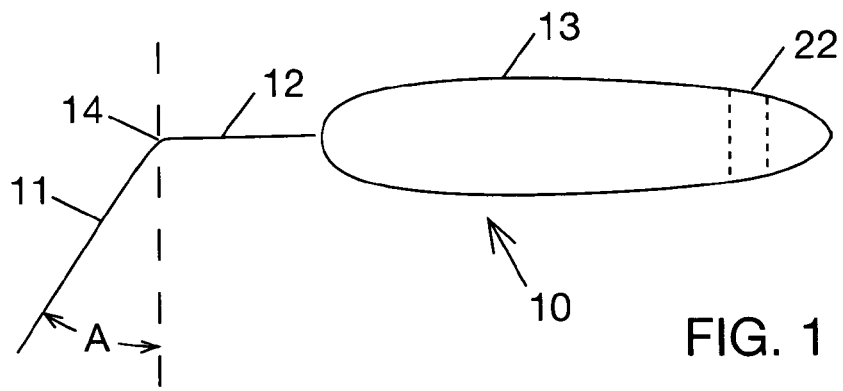
FIG. 1 illustrates a side view of a skewer food removal device according to the teachings of a preferred embodiment of the invention.
Figure 8:
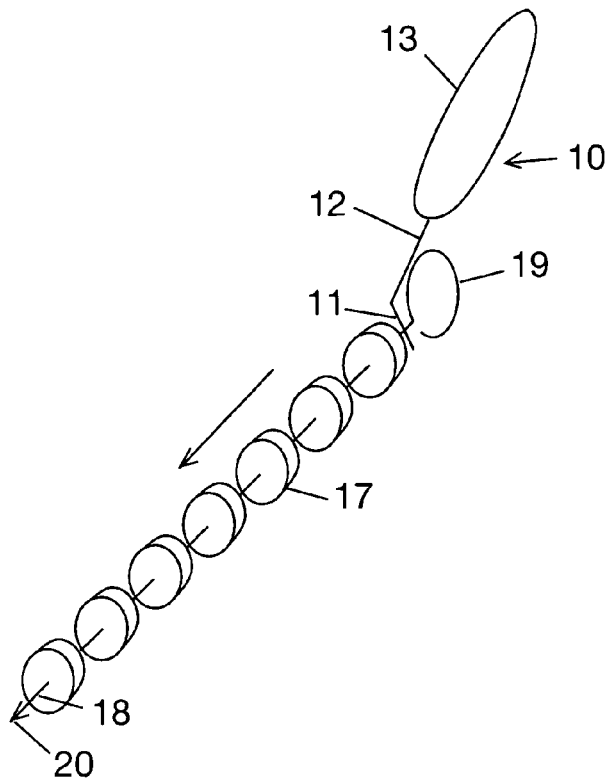
FIG. 8 illustrates a view of the food removal device in engagement with an end piece of food on a skewer according to the teachings of a preferred embodiment of the invention.
Figure 9:
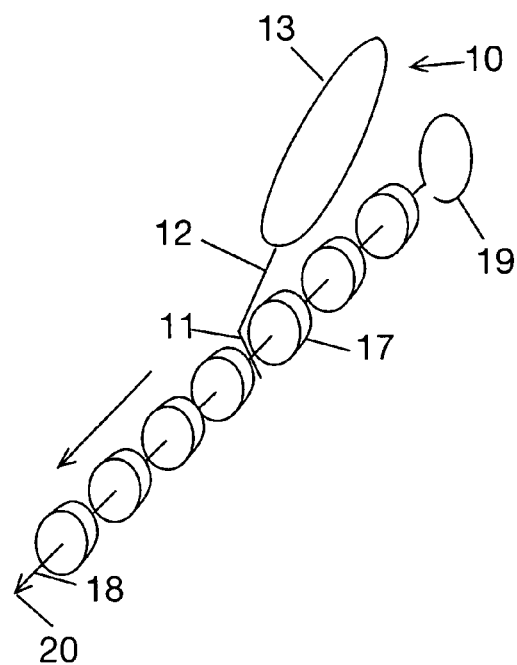
FIG. 9 illustrates a view of the food removal device in engagement with a piece of food at another food location on a skewer according to the teachings of a preferred embodiment of the invention.

Referring to FIG. 1, there is shown the food removal device 10 of the present invention with its parts, including the body portion 11, the arm 12 and the handle 13. Body portion 11 is shown connected at area 14 at an angle to arm 12, such angle being about 90 degrees, and preferably an angle of about 90 degrees plus an angle A which may be about 15 degrees to about 45 degrees for ease of operation in removing food from a skewer. As will be seen, the total angle between the arm 12 and the body portion 11 may be less than 90 degrees without departing from the spirit and scope of the present invention The total angle is picked in order to assure that a person's hand holding the handle 13 will not come in contact with the food when it is being pushed off the skewer 18 as shown in FIGS. 8 and 9.

It should be understood that the angle between arm 12 and body portion 11 may be a simple curve with a radius to achieve the desired result. Body portion 11 is preferably made from stainless steel. In addition, arm 12 may also be made from stainless steel. It should be understood that arm 12 may be nothing more than the junction of handle 13 and body portion 11 at area 14. Also, area 14 need not be at the top of body portion 11 particularly if arm 12 and body portion 11 are made from separate pieces of material. For example, area 14 may be half way down the sides of body portion 11. Body portion 11 and arm 12 may be made from one piece of metal such as stainless steel and bent at area 14 to achieve the desired results or may be made entirely, including the handle 13, from a plastic type material. The handle 13 may be made from stainless steel, but preferably is manufactured and/or formed from a generally rigid material (e.g., wood, metal, ceramic, and/or a thermoplastic). The handle need not be made using insulating material since the food removal device of the present invention is not in close proximity with heat when the food is being cooked. The handle 13 may include an opening 22 which may be used to hang the food removal device 10 in a convenient place. The handle 13 is attached in any well known manner to arm 12. As will be discussed with respect to FIGS. 8 and 9, the food removal device is used to push the food 17 off of the skewer 18 from the handle end or from anywhere on the skewer 18. The added angle A allows the handle, as well as the hand of the person holding the handle, to be positioned away from the food 17 when removing the food. It should be understood that the device 10 may also be used to pull the food 17 from the skewer 18.

Figure 2:
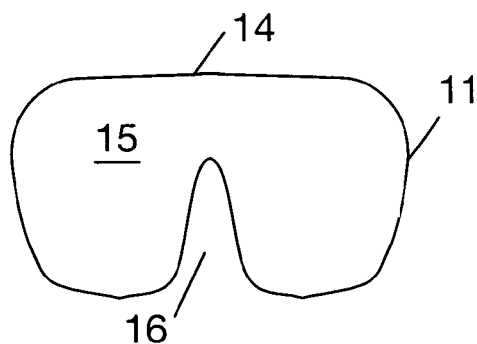
FIG. 2 illustrates a front view of the body portion of the food removal device with a slit of tapered width according to the teachings of a preferred embodiment of the invention.
Figure 3:
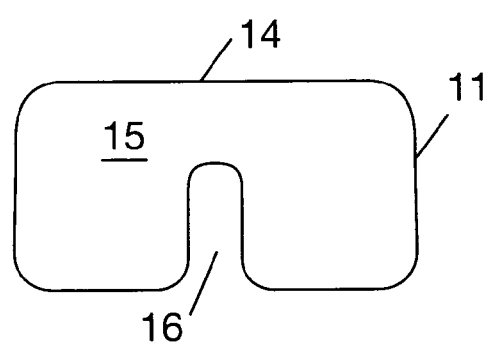
FIG. 3 illustrates a front view of the body portion of the food removal device with a slit of substantially uniform width according to the teachings of a preferred embodiment of the invention.

FIGS. 2 and 3 show a front view of the body portion 11 in two different configurations. Body portion 11 includes a face 15 with a slot 16 cut out of the bottom portion of the face 15 and extending up the face 15 about half way, or even higher, to area 14. The slot 16 in FIG. 2 is shown to be of variable width so that it may adapt to various shapes of skewers in order to have maximum contact of the face 15 with the food being removed. Although skewers are usually round and of minimal diameter, there are skewers which are square in shape, the size of which may be as much as one quarter inch per side. These skewers are usually found used on automatic skewer turning mechanisms. Skewers can also be found which are rectangular in shape. The use of the variable width slot 16 allows the skewer to fit up into the slot 16 in order to better accommodate the different size skewers. FIG. 3 shows the slot 16 to have substantially uniform width. The width, however, must be large enough to accommodate larger skewers, whether they are square or rectangular in shape. The shape of slot 16 may also be used to accommodate skewers which have two rods used in some designs so that the food will not rotate on the skewer. To accommodate such skewers with two rods, the slot 16 of body portion 14 may be aligned so that at least one of the two rods, and preferably both rods, will fit in slot 16, or, in another design, the body portion 14 may be designed with two slots 16 set apart from each other the same distance as the two rods of the skewer are apart.

Figure 4:
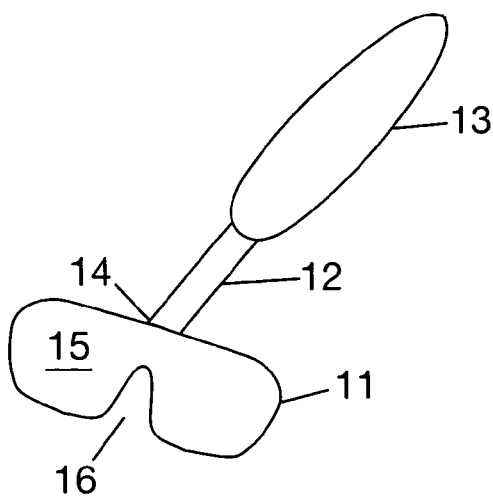
FIGS. 4, 5, 6 and 7 are front end views of several configurations of the body portion of the food removal device and the attachment to the handle coupled therewith.
Figure 5:
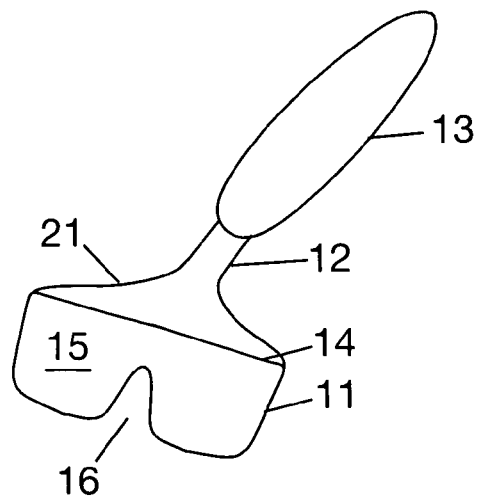
Figure 6:
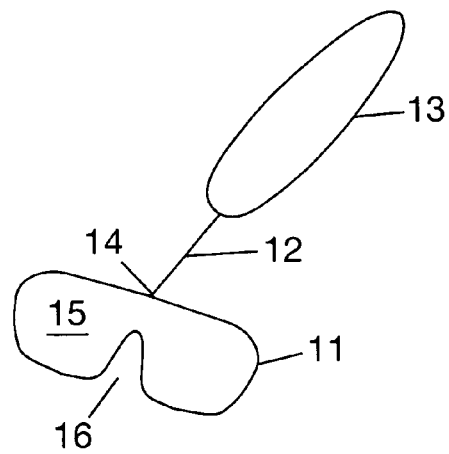
Figure 7:
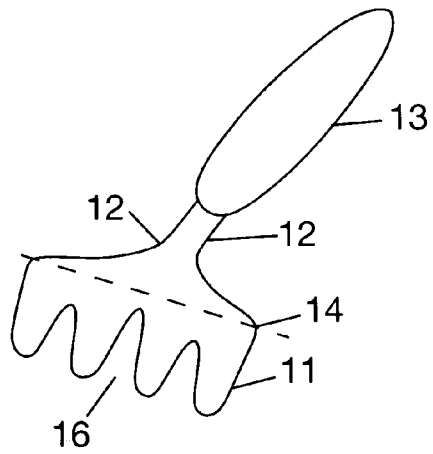

FIGS. 4, 5, 6 and 7 show alternative front perspective views of the device 10, more particularly with respect to connection between the body portion 11 and the arm 12. In FIG. 4, the arm 12 is shown to be a flat piece of material such as metal which is connected to body portion 11 at area 14. Arm 12 is preferably made from stainless steel and is made from the same piece of metal as body portion 11 and bent at area 14 to provide a suitable angle for the face 15 with respect to the arm 12 and handle 13. In FIG. 5, the arm 12 is shown to be a flat piece of material which is connected to a shoulder 21, which shoulder 21 is preferably cut from the same piece of metal as body portion 11 and bent at area 14. The arm 12, shoulder 21 and body portion 11 are preferably made from one piece of metal such as stainless steel. In FIG. 6, the handle 13 may be connected to body portion 11 by an arm 12 which is of rod shape, with the arm 12 and body portion 11 connected at area 14 by a welding or brazing bond or the like. The configuration shown in FIG. 6 may actually have two arms 12 connected at either side of body portion 11 with both arms set into handle 13. In FIG. 7, the arm 12 may actually be integrated with body portion 11 on both sides of body portion 11 to form a double arm 12 connecting to handle 13. Body portion may be constructed using a rod shaped material which is shaped to form a finger like surface with slot 16 in the middle and one or more slots of preferably a smaller width on each side of slot 16. In such configuration, area 14 need not be near the top of body portion 11, but instead may be shaped to extend toward handle 13 near the middle of the sides of body portion 11.

FIGS. 8 and 9 show the use of the food removal device 10 with the food 17 on skewer 18. The device 10 is designed to be placed behind the food 17 to be removed and the food 17 is pushed off the skewer in the direction of the arrow off the end 20 of the skewer 18. In FIG. 8, the device 10 is shown placed behind the food 17 at the handle end 19 of skewer 17. However, sometimes it is preferable, as shown in FIG. 9, to remove the food 17 from somewhere on the skewer other than the handle end 19. This may be desired if, for example, the food 17 is stuck to the skewer 18 thereby making it difficult to push off. It may also be desired if some of the food near the handle end 19 is not cooked as well as the food 17 at the end 20. It can also be seen that the device 10 may be used to pull the food 17 off of skewer 18 by merely changing the direction of placement of device 10 over food 17. It has been found, however, that pushing the food 17 off is easier than pulling it off the skewer 18.

It should be understood that the invention is not limited to the exact embodiment or construction which has been illustrated and described but that various changes may be made without departing from the spirit and the scope of the invention.

What is claimed is:

1. The combination comprising:
   A. A skewer for holding food;
   B. Removal means for removing said food from said skewer, said removal means comprising:
      1. Body means having a bottom side and a top side, said bottom side having an opening placed substantially in the middle of said body means, with said opening starting from the bottom side of said body means toward the top side of said body means, wherein said opening is shaped such that the end of said opening at said bottom side of said body means is wider than the end of said opening nearer the top side of said body means, so that said removal means may be used with various size skewers, and wherein said opening is shaped substantially in the form of the letter "V", with the open end of the "V" at said bottom side of said body means; and
      2. Extension means, having a front end and a rear end, said front end connected to said body means so as to form an angle between said extension means and said body means, and said rear end used for the purpose of holding said removal means, wherein said extension means includes a handle and an arm, said arm having two ends, said arm connected to said handle at one end and to said body means at the other end, and wherein said angle between said extension means and said body means is set so that a substantial portion of said extension means will not come in contact with said food when said food is being removed from said skewer, and wherein said angle is 90 degrees or more, but not greater than 135 degrees; and
      3. Shoulder means connected between said body means and said extension means such that said angle is formed between said shoulder means and said body means, whereby said removal means is strengthened at said angle; and
   C. Said removal means aligned with said skewer by use of said opening in said body means in order to remove said food from said skewer.

* * * * *